United States Patent
Shivashankara (10) Patent No.: US 11,366,653 B2
(45) Date of Patent: Jun. 21, 2022

(54) UPDATING APPLICATION CODE

(71) Applicant: HEWLETT PACKARD ENTERPRISE DEVELOPMENT LP, Houston, TX (US)

(72) Inventor: Lokesh Shivashankara, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 109 days.

(21) Appl. No.: 16/866,491

(22) Filed: May 4, 2020

(65) Prior Publication Data
US 2020/0379746 A1    Dec. 3, 2020

(30) Foreign Application Priority Data
Jun. 3, 2019   (IN) .............................. 201941022051

(51) Int. Cl.
*H04L 29/06* (2006.01)
*H04L 9/32* (2006.01)
*H04L 29/08* (2006.01)
*H04L 9/08* (2006.01)
*H04W 12/06* (2021.01)
(Continued)

(52) U.S. Cl.
CPC ................ *G06F 8/65* (2013.01); *G06F 21/45* (2013.01); *H04L 43/10* (2013.01); *H04L 63/10* (2013.01); *H04L 67/34* (2013.01)

(58) Field of Classification Search
CPC . H04L 63/0428; H04L 63/062; H04L 63/123; H04L 63/126; H04L 9/3247; H04L 9/3213; H04L 67/14; H04L 63/0807; H04L 63/0884; H04L 63/08; H04L 63/10; H04L 63/083; H04L 67/34; H04L 67/10; G06F 21/57; G06F 21/51; G06F 8/61; G06F 8/65; G06F 21/44; G06F 21/45
See application file for complete search history.

(56) References Cited

U.S. PATENT DOCUMENTS 10,002,247 B2   6/2018   Suarez et al.
10,715,564 B2 *  7/2020   Mohamad Abdul ........................ H04L 65/1073
(Continued)

FOREIGN PATENT DOCUMENTS

CN    108279921 A    7/2018

OTHER PUBLICATIONS

Ahmad et al., A Multi-token Authorization Strategy for Secure Mobile Cloud Computing, 6 pages (Year: 2014).*
(Continued)

*Primary Examiner* — Thuy Dao
(74) *Attorney, Agent, or Firm* — Hewlett Packard Enterprise Patent Department (57) ABSTRACT

An application code updating apparatus is disclosed. The apparatus comprises a processor to receive application deployment code defining an application to be deployed in a cloud-computing environment; determine, from the application deployment code, an identity of a cloud-based repository from which to retrieve the application; obtain, from a database, an authentication credential for the identified repository; generate, based on the authentication credential, an access token to provide access to the repository; and update the application deployment code to include the generated access token. A method and a machine-readable medium are also disclosed.

17 Claims, 5 Drawing Sheets

(51) Int. Cl.

| | |
|---|---|
| *G06F 21/60* | (2013.01) |
| *G06F 8/65* | (2018.01) |
| *H04L 9/40* | (2022.01) |
| *H04L 67/00* | (2022.01) |
| *H04L 43/10* | (2022.01) |
| *G06F 21/45* | (2013.01) |

(56) References Cited

U.S. PATENT DOCUMENTS

| | | | |
|---|---|---|---|
| 2014/0366080 A1* | 12/2014 | Gupta | ............ H04L 63/20 726/1 |
| 2017/0177860 A1 | 6/2017 | Suarez et al. | |
| 2018/0309747 A1 | 10/2018 | Sweet et al. | |
| 2020/0145515 A1* | 5/2020 | Fleck | ............ H04L 63/20 |

OTHER PUBLICATIONS

Amit Jagtap, "How to configure and use AWS ECR with kubemetes & Rancher2.0", available online at <https://medium.com/@damitj07/how-to-configure-and-use-aws-ecr-with-kubemetes-rancher2-0-6144c626d42c>, Jun. 2, 2018, 9 pages.

Guy Maliar, "Dynamic secrets on Kubernetes pods using Vault", available online at <https://medium.com/@gmaliar/dynamic-secrets-on-kubemetes-pods-using-vault-35d9094d169>, Mar. 16, 2018, 13 pages.

IBM Cloud Docs, "Automating access to IBM Cloud Container Registry", available online at <https://cloud.ibm.com/docs/Registry?topic=Registry-registry_access>, Nov. 14, 2018, 8 pages.

Marc Campbell, "Don't Embed Configuration or Secrets in Docker Images", available online at <https://medium.com/@mccode/dont-embed-configuration-or-secrets-in-docker-images-7b2e0f916fdd>, Sep. 21, 2017, 7 pages.

\* cited by examiner

UPDATING APPLICATION CODE

BACKGROUND

As an alternative to traditional computer systems in which applications may be stored in a storage medium (e.g. a memory) of a computing device and executed using a processor of the computing device, operating system-level (OS-level) virtualisation may be implemented, which allows multiple isolated user-space instances to exist and function concurrently. In some examples, such instances may be implemented using a "container" mechanism. Containers are isolated from one another, and each container may include its own software, reference libraries and configuration files.

Each container may be created from an "image", also referred to as an application, which defines the contents of the container. In some examples, container images, or applications, may be downloaded from public repositories. In other examples, container images may be created from scratch or by combining and modifying existing images.

BRIEF DESCRIPTION OF DRAWINGS

Examples will now be described, by way of non-limiting example, with reference to the accompanying drawings, in which.

DETAILED DESCRIPTION

In an OS-level virtualisation environment, code defining an application, or container image, may be executed in response to a user request or a system request. Execution of the code may lead to the deployment of the application. Such a request may be made, for example, by a user making a selection a representation of an application, using a user interface of a computing device. A request to retrieve the application may then be forwarded to a repository or to a service provider managing such a repository. Responsive to the request, the repository may provide the application so that the requested application can be deployed.

In some examples, the OS-level virtualisation may be implemented using a container-based system, whereby a container may include a software package. In such examples, an application may comprise an "image" or "container image" which, when deployed, may cause an instance of container to be executed. An example of such a container-based environment is Docker™, provided by Docker, Inc. Various systems may be used for implementing the deployment and management of containers. An example of a container-orchestration system is Kubernetes™, developed by the Cloud Native Computing Foundation. While examples of this disclosure are presented herein in the context of a container-based system, which may be implemented using Docker™ and/or Kubernetes™, it will be understood that the apparatuses and methods disclosed herein may be implemented using other systems and environments.

In some examples, an application (e.g. an image) may not be provided responsive to a request for said application in certain circumstances. For example, an application may be withheld and not provided in response to a request, in the event that the requester (e.g. a human user or a computing device) is not, or does not appear to be, authorised to obtain the application. For example, an application may be provided by a repository if the requester has sufficient authority to obtain the application, or if the requester is able to demonstrate that it has the intended credentials allowing it to access or deploy the application.

According to some examples, in order for a requester to successfully obtain or deploy an application (e.g. a deployable container image), authentication credentials of the requester may be demonstrated by the user submitting its credentials for verification. In some examples, authentication credentials for a particular repository (e.g. a repository from which the application is to be obtained) may be acquired and used to generate an access token which may be used to provide access to the repository. An access token may be time-limited, such that the token cannot be used, or becomes inactive, after a defined duration. Thus, if the access token has not been used within the defined duration, then a new access token is to be generated to obtain access to the repository.

In some examples, such as those examples in which Docker™ and/or Kubernetes™ are implemented, confidential information, such as credentials, tokens, passwords and the like, may be referred to as "secrets". Secrets are managed in a secure way such that any information contained within a secret is encrypted in storage and in transit, and an application accessing a secret is able to access just the particular secret to be used—no more, no less. In some examples, an access token may be stored as a "secret", also referred to as a "Kubernetes secret", for example in a database.

Using existing approaches, if a token expires (e.g. through non-use within the defined duration), then a new token may be created, for example by a human operator or administrator. According to examples disclosed herein, if a situation arises where it is determined that a new token is to be generated (e.g. because an existing token has expired), then a new token may be generated automatically (i.e. without further user input). In this way, a situation may be avoided in which an application (e.g. a container image) cannot be obtained from a repository because an authentication token had expired. Furthermore, authentication tokens for each repository may be renewed automatically.

Figure 1:
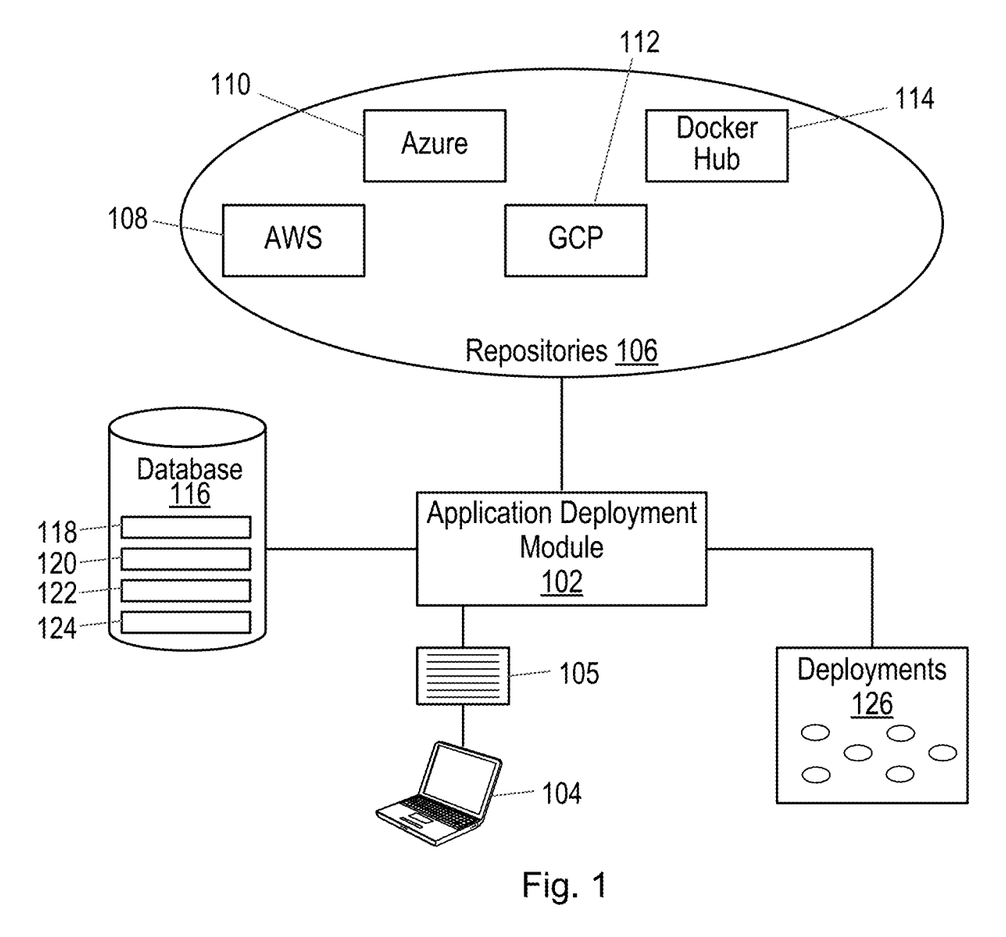
FIG. 1 is a schematic illustration of an example of a software virtualisation environment capable of updating application code.

Examples of the present disclosure will now be described with reference to the drawings. FIG. 1 is a schematic illustration of an example of a software virtualisation environment 100 capable of updating application code. Within the environment 100, an application deployment module 102 may be implemented using a computing device or apparatus, or a server (not shown). A user may operate a user interface (UI) device 104 to interact with the application deployment module 102. The UI device 104 may, for example, comprise a desktop computer, a laptop computer, a tablet computer, a smartphone, a wearable device or any other computing device capable of receiving a user input. For example, a user may provide an input to the UI device 104 requesting or instructing an application to be deployed in a cloud-computing environment or a hybrid cloud-computing environment. In some examples, the application may comprise a container image to be deployed in a Kubernetes cluster. The request or instruction received by the application deployment module 102 may be in the form of, or may include, application deployment code 105 which may, for example, comprise a set of computer-executable instructions defining the requested application, and including other information, such as details of the requester. The application deployment code 105 may be used to retrieve the application from one of the repositories 106. The application deployment code 105 may, in some examples, comprise code in '.yaml' format (e.g. 'deployment.yaml') or in the form of a helm chart. The apparatus in which the application deployment module 102 is implemented may further be capable of updating application code (e.g. application deployment code), as discussed in greater detail below.

The application (e.g. the image) may be stored in a repository, such as an image repository. Numerous image repositories 106 are provided by various service providers, and the particular repository from which the application is to be requested or obtained may depend on the nature of the particular application in question. For example, a first application (e.g. an email service application) may be provided by a first service provider and, therefore, may be requested from a first repository. A second application (e.g. a document database application) may be provided by a second service provider and, therefore, may be requested from a second repository. In the example shown in FIG. 1, the plurality of repositories 106 may include an Amazon Elastic Container Registry (ECR) 108, developed by Amazon.com, Inc., a Microsoft Azure repository 110, developed by Microsoft Corporation, a Google cloud platform (GCP) repository 112, developed by Google LLC, and a Docker Hub repository 114, developed by Docker, Inc. Other repositories provided by one or more other providers may also be included in the plurality of repositories 106 from which an application may be requested.

As noted above, some repositories 106 may include an authentication procedure before an application is provided or made available to a requester (e.g. the UI device 104). In examples where a repository 106 does not perform an authentication procedure, the repository may, responsive to receiving a request for an application (e.g. a container image) provide the requested application to the requester for deployment. However, in examples where the repository 106 does include an authentication procedure, the repository may not provide the requested application until the requester has been authenticated (e.g. until the requester has demonstrated that it has the intended credentials). In some examples, the application deployment code 105 (e.g. the .yaml code) may be considered to be authenticated and may be capable of retrieving an application from one of the repositories 106 if it includes a relevant authentication token or access token. If the application deployment code 105 does not include such a valid token, and the code may be considered not to be authenticated and, therefore, the requested application may not be provided.

According to some examples, the application deployment module 102 may examine or analyze the application deployment code 105 received, for example, from the UI device 104. The application deployment code 105 may, in some examples, comprise or include a uniform resource locator (URL). The application deployment module 102 may inspect the application deployment code 105, for example by parsing the code (e.g. a URL) in order to determine various pieces of information. An example of information that may be determined from the application deployment code 105 is a name or identity of an application to be requested. Another example of information that may be determined from the application deployment code 105 is a name or identity of a repository 106 where the application is stored and/or from which the application may be retrieved. For example, the application deployment code 105 may include information identifying one of the repositories 108 to 114 as a repository from which the requested application may be retrieved.

As noted above, each repository 106 may have its own authentication mechanism and, therefore, different authentication credentials may exist for each of the repositories. According to examples disclosed herein, the authentication credential(s) for various repositories 106 may be stored centrally in a secure storage facility or database 116. In one example, the storage facility or database 116 may comprise a secrets management mechanism, such as HashiCorp Vault, provided by HashiCorp. The database 116 may, for example, include details of authentication credentials for each of the repositories 108 to 114. For example, the database 116 may include the first credentials 118 corresponding to the repository 108, second credentials 120 corresponding to the repository 110, third credentials 122 corresponding to the repository 112 and fourth credentials 124 corresponding to the repository 114. The database 116 may also include credentials for other repositories. In some examples, the application deployment module 102 and/or the database 116 may be implemented as pods created to function in an OS-level virtualisation environment, such as Kubernetes.

The application deployment module 102 may be able to communicate directly or indirectly with the database 116 and, therefore, may be able to retrieve appropriate authentication credentials from the database. For example, if it is determined from the application deployment code 105 that a particular application intended to be deployed is available from the Amazon ECR repository 108, then the application deployment module 102 may communicate with the database 116 request and/or retrieve the authentication credentials 118 corresponding to the Amazon ECR repository.

In some examples, an access token may be generated, for example based on the retrieved authentication credentials, for use in gaining access to the application in the repository. Thus, upon receiving the appropriate authentication credentials 118 from the database 116, the application deployment module 102 may generate an access token based on the authentication credential. As noted above, the access token may form part of the application deployment code 105. Therefore, once access token has been generated by the application deployment module 102, the generated access token may be added to or incorporated into the application deployment code 105 so that the code can be used to access the relevant repository (e.g. the Amazon ECR repository 108) in order to retrieve the intended application.

In some examples, as discussed previously, access tokens may remain valid for a defined period of time and, once the defined period has expired, the access token may no longer provide access to a particular repository. Thus, application deployment code 105 may be updated by the application deployment module 102, for example to replace an expired access token with a newly-generated valid access token.

Once the application deployment module 102 has provided the application deployment code 105 (which includes a valid access token) to retrieve the intended application from one of the plurality of repositories 106, the application deployment module may execute the deployment code, thereby to cause the application to be deployed. Applications deployed by the application deployment module 102 may be referred to as deployments 126. The deployments 126 may be controlled by, interacted with and/or operated by the UI device 104 or a user thereof.

Figure 2:
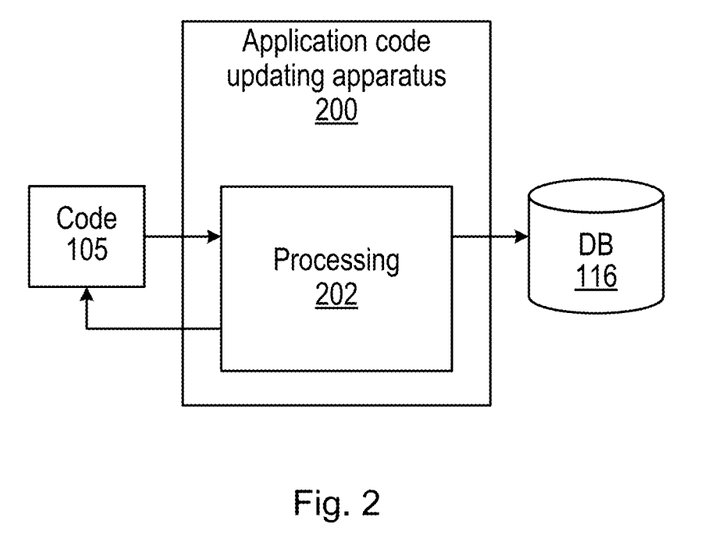
FIG. 2 is a schematic illustration of an example of an application code updating apparatus.

As noted above, the application deployment module 102 may be implemented using an apparatus such as a computing device. FIG. 2 is a schematic illustration of an example of an apparatus 200 that may include or be used to implement the application deployment module 102. The apparatus 200 may comprise an application code updating apparatus. For example, the apparatus 200 may update application deployment code 105. The apparatus 200 comprises a processor 202, which is to receive application deployment code 105 defining an application to be deployed in a cloud-computing environment. The application deployment code 105 may, for example, be provided by the UI device 104. The processor 202 is further to determine, from the application deployment code 105, an identity of a cloud-based repository 106 from which to retrieve the application. The processor 202 further to obtain, from a database 116, an authentication credential (e.g. the credentials 118 to 124) for the identified repository. The database 116 may comprise a secure authentication credentials storage facility. For example, the database 116 may comprise or form part of the HashiCorp Vault. The processor 202 is further to generate, based on the authentication credential, an access token to provide access to the repository. The processor 202 is further to update the application deployment code 105 to include the generated access token. As noted above, the application may comprise a computer-executable or computer-deployable image of a container-based application.

According to some examples of the present disclosure, the processor 202 and/or the application deployment module 102 may automatically obtain a new access token from the database 116 at defined intervals, and update the application deployment code 105 with the new access token, so that the application deployment code includes a valid access token. This reduces occurrences of situations where an application is to be retrieved from one of the repositories 106, but the access token in the application deployment code 105 has expired. Thus, manual updating of the access token in the application deployment code 105 (for example in response to a rejection to a request to obtain an application) may be avoided.

In some examples, the application deployment module 102 and/or the processor 202 may perform or initiate a polling procedure to determine whether any attempted application deployments have failed as a result of an access token having expired. In the event that the polling determines that an attempted deployment of an application has failed, for example because the access token included in the application deployment code 105 has expired, then the application deployment module 102 and/or the processor 202 may examine the application deployment code 105 to identify a repository from which the application may be retrieved, then obtain the appropriate authentication credential for the application from the database 116, then generate a new access token based on the obtained authentication credential and, finally, update the application deployment code 105 with the new access token. Thus, in some examples, prior to receiving the application deployment code 105, the processor 202 may intermittently poll the cloud-computing environment for an attempted deployment of an application. The processor 202 may also, responsive to detecting an attempted application deployment in the cloud-computing environment, determine that the attempted application deployment experiences a deployment error. In one example, the occurrence of a deployment error may be indicated by the deployment of the application leads to an error state, sometimes referred to as an "ImagePullBackErr" state. Thus, if it is determined that the attempted application deployment has experienced a deployment error, the processor 202 may proceed with the other functions discussed above (i.e. receive, determine, obtain, generate and update) to prevent a further deployment error occurring in respect of that application.

The defined time period during which an access token is to remain valid may, in some examples, comprise a period of between around 2 hours and around 24 hours, ora period of between around 10 hours and around 14 hours. In one example, the time period may comprise a period of around 12 hours. Thus, in some examples, the processor 202 may perform the above-described polling procedure periodically so that the access tokens of applications may be updated regularly. In one example, the processor may poll the cloud-computing environment periodically, at approximately every 10 to 14 hours.

Once the processor 202 has determined the identity of the repository 106 from which the intended application may be retrieved, and if the access token in the application deployment code 105 is a valid, then the application may be retrieved and deployed. Thus, in some examples, responsive to determining the identity of the cloud-based repository from which to retrieve the application, the processor may be to retrieve the application from the identified cloud-based repository. In some examples, the processor 202 may be to deploy the application in the cloud-computing environment.

An example of a portion of application deployment code 105 is shown below. In this example, the application deployment code 105, which may for example be provided by the UI device 104 to the application deployment module 102, includes the following URL:

http://123456789.dkr.ecr.my-region-1.amazonawx.com/my-app

When the application deployment module 102 analyses the application deployment code 105 and, in particular, the URL recited therein, various details may be extracted. For example, it may be determined that the application to which the URL relates may be obtained from the Amazon ECR repository 108. Parsing the application deployment code 105 also enables the following details to be determined:

```
ACCOUNT=1234567890
REGION=us-east-1
SECRET_NAME=${REGION}-ecr-registry
TOKEN=`aws ecr get-login --region ${REGION} --registry-ids ${ACCOUNT} | cut -d' ' -f6`
  kubectl create secret docker-registry $SECRET_NAME --docker-
  server=https://${ACCOUNT}.dkr.ecr.${REGION}.amazonaws.com --docker-
  username=AWS --docker-
  password="${TOKEN}" --docker-
  email="${EMAIL}"
```

In the example above, a user provides authentication details (e.g. a username and password) to obtain authentication credentials from the database 116 for the Amazon ECR repository 108, and an access token is generated based on the obtained authentication credentials. The user's authentication details may also be stored in the database 116.

Figure 3:
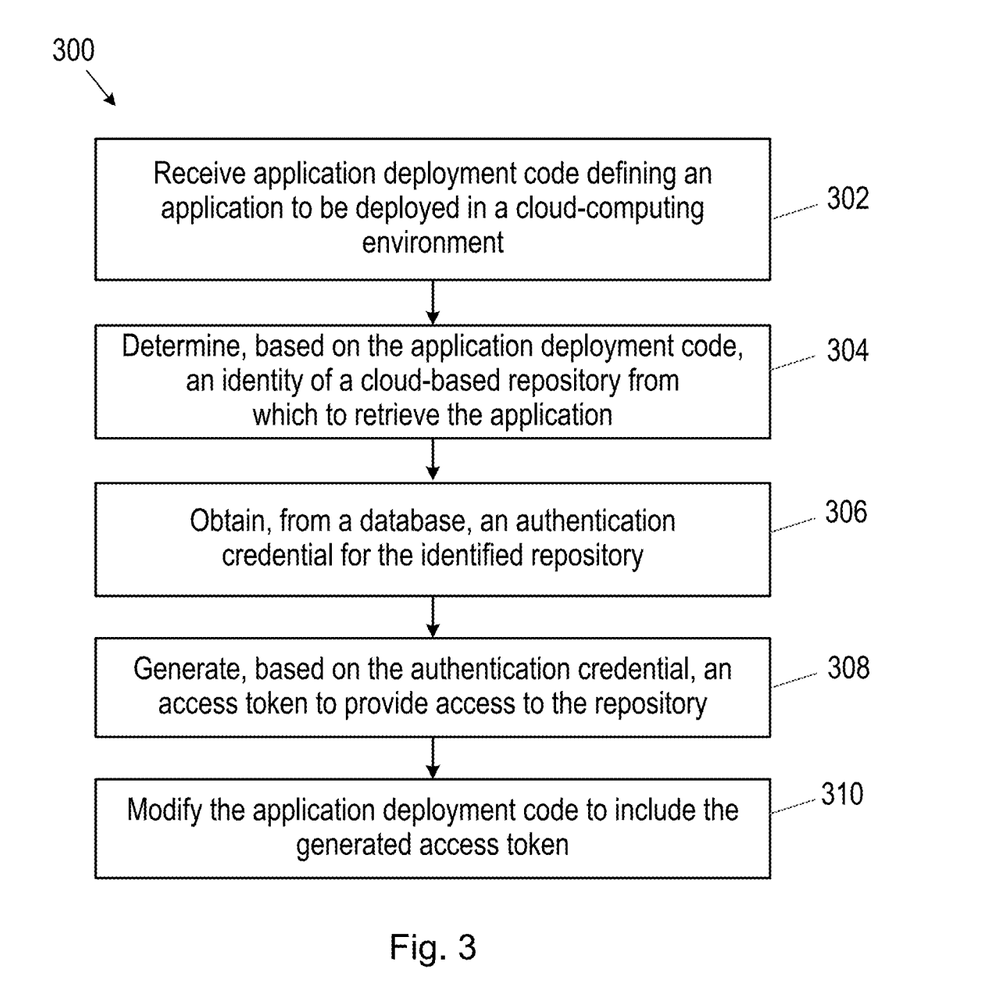
FIG. 3 is a flowchart of an example of an automated application code modification method.

FIG. 3 is a flowchart of an example of an automated application code modification method 300. The method comprises, at block 302, receiving application deployment code 105 defining an application to be deployed in a cloud-computing environment. As discussed above, the application deployment code 105 may, in some examples, comprise a computer-executable image of a container-based application. At block 304, the method 300 comprises determining, based on the application deployment code 105, an identity of a cloud-based repository 106 from which to retrieve the application. The method 300 comprises, at block 306, obtaining, from a database 116, an authentication credential for the identified repository 106. The database 116 may, in some examples, comprise a secure authentication credential storage facility. In some examples, the database 116 may comprise or form part of a facility such the HashiCorp Vault. At block 308, the method 300 comprises generating, based on the authentication credential, an access token to provide access to the repository 106. The method 300 comprises, at block 310, modifying the application deployment code 105 to include the generated access token.

Figure 4:
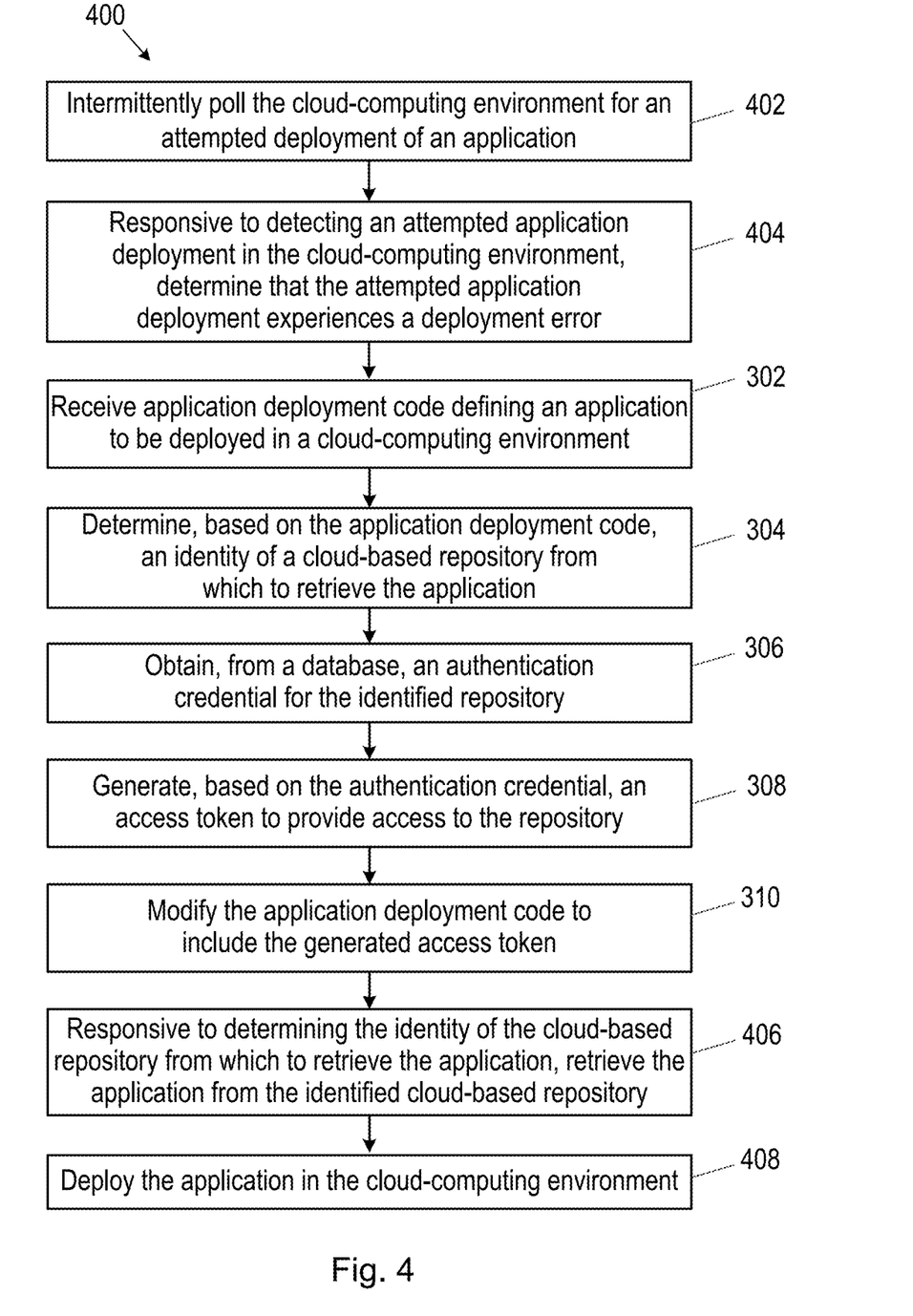
FIG. 4 is a flowchart of a further example of an automated application code modification method.

FIG. 4 is a flowchart of a further example of an automated application code modification method 400. The method 400 may include blocks described above with reference to the method 300. The method 400 may further comprise, prior to receiving the application deployment code, at block 402, intermittently polling the cloud-computing environment for an attempted deployment of an application. The method 400 may further comprise, prior to receiving the application deployment code, responsive to detecting an attempted application deployment in the cloud-computing environment, determining that the attempted application deployment experiences a deployment error. In this way, if a failed deployment is identified, then the process to generate a new access token can be automatically initiated, so that the deployment of the application can be repeated successfully. Polling the cloud-computing environment may be repeated at intervals (e.g. periodically, at regular intervals), so that access tokens that have expired may be renewed regularly. In some examples, intermittently polling (block 402) may comprise polling the cloud computing environment periodically, at approximately every 10 to 14 hours.

The method 400 may further comprise, at block 406, responsive to determining the identity of the cloud-based repository from which to retrieve the application, retrieving the application from the identified cloud-based repository. The retrieving of block 406 may be performed if the application deployment code 105 includes a valid access token. If a valid access token is not included in the application deployment code 105 (e.g. if the access code has expired, for example through lack of use within a defined period), then the deployment may fail, resulting in a deployment error. At block 408, the method 400 may, in some examples, further comprise deploying the application in the cloud-computing environment.

Blocks of the methods 300, 400 may be performed using the application deployment module 102 and/or the processor 202.

Figure 5:
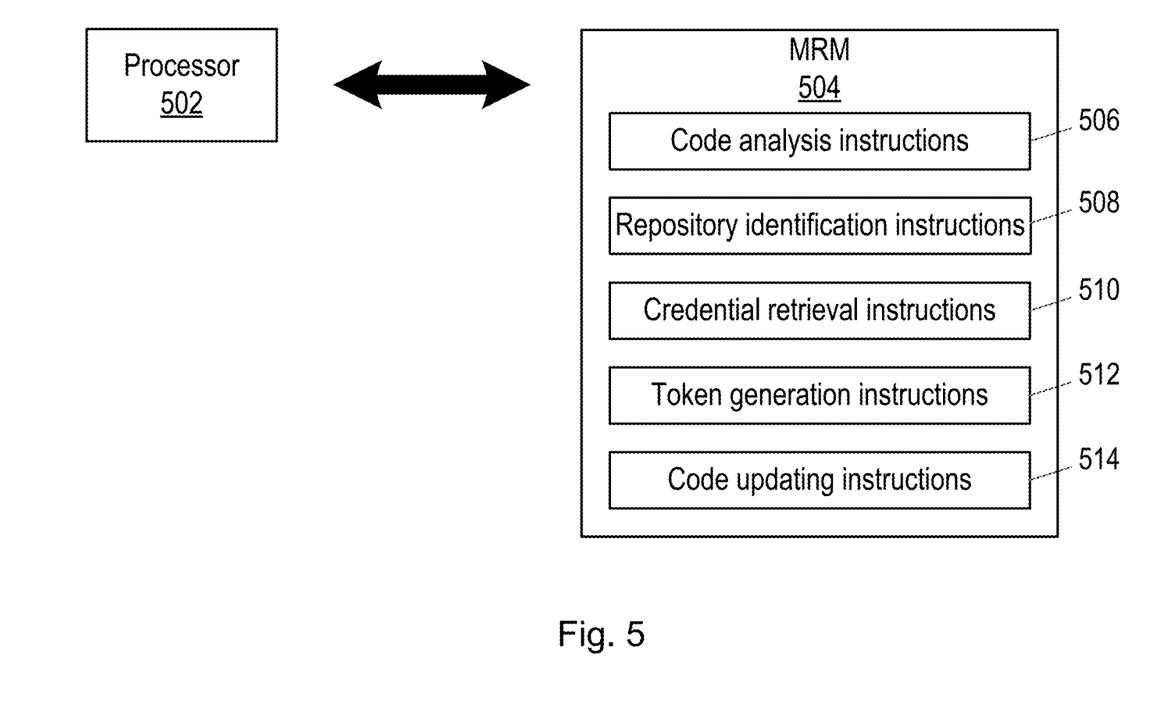
FIG. 5 is a schematic illustration of a processor in communication with the machine-readable medium.

Examples in the present disclosure also provide a machine-readable medium. FIG. 5 is a schematic illustration of an example of a processor 502 in communication with a machine-readable medium 504. The machine-readable medium 504 comprises instructions 506 to 514 which, when executed by the processor 502, cause the processor to perform various functions, such as those discussed in the methods 300, 400. The machine-readable medium 504 may comprise code analysis instructions 506 which, when executed by the processor 502, cause the processor to analyse deployment code associated with an application to be deployed in a cloud-computing environment. The machine-readable medium 504 may comprise repository identification instructions 508 which, when executed by the processor 502, cause the processor to identify, based on the deployment code, a cloud-based repository from which to retrieve the application. The machine-readable medium 504 may comprise credential retrieval instructions 510 which, when executed by the processor 502, cause the processor to retrieve, from a secure authentication credential source, an authentication credential for the identified repository, the secure authentication credential source comprising an authentication credential for each of a plurality of repositories. In some examples, the secure authentication credential source may comprise a secure authentication credential storage facility, such as the HashiCorp Vault facility. The machine-readable medium 504 may comprise token generation instructions 512 which, when executed by the processor 502, cause the processor to generate, based on the retrieved authentication credential, an access token to provide access to the identified repository. The machine-readable medium 504 may comprise code updating instructions 514 which, when executed by the processor 502, cause the processor to update the deployment code to include the generated access token.

In some examples, the application deployment code 105 may comprise a computer-executable image of a container-based application. For example, the application deployment code 105 may comprise a private Docker™ container image.

The machine-readable medium 504 may, in some examples, comprise polling instructions which, when executed by the processor 502, cause the processor to intermittently poll the cloud-computing environment for an attempted deployment of an application, and error determination instructions which, when executed by the processor 502, cause the processor to, responsive to detecting an attempted application deployment in the cloud-computing environment, determine that the attempted application deployment experiences a deployment error. In some examples, the polling instructions may cause the processor 502 to poll the cloud-computing environment periodically, at approximately every 10 to 14 hours.

The machine-readable medium 504 may, in some examples, comprise application retrieval instructions which, when executed by the processor 502, cause the processor to retrieve the application from the identified cloud-based repository, and application deployment instructions which, when executed by the processor 502, cause the processor to deploy the application in the cloud-computing environment.

Thus, the apparatus, methods and machine-readable medium disclosed herein provide a mechanism by which an access token application deployment code may be automatically updated, such that an expired or invalid access code can be replaced, to enable an application to be retrieved from a repository (e.g. a cloud-based repository), without further user input. Thus, for multiple applications, stored in multiple repositories, deployment code can be quickly and effectively updated. Moreover, by performing the disclosed polling procedure, the apparatus is able to identify those applications which cannot be deployed, and update the access tokens within their application deployment code to enable successful deployment, without further user input.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

What is claimed is:

1. An application code updating apparatus, comprising:
a processor to:
prior to receiving application deployment code defining an application to be deployed in a cloud-computing environment, intermittently poll the cloud-computing environment for an attempted deployment of an application;
responsive to detecting an attempted application deployment in the cloud-computing environment, determine that the attempted application deployment experiences a deployment error;
receive the application deployment code;
determine, from the application deployment code, an identity of a cloud-based repository from which to retrieve the application;
obtain, from a database, an authentication credential for the identified repository;
generate, based on the authentication credential, an access token to provide access to the repository; and
update the application deployment code to include the generated access token.

2. An apparatus according to claim 1, wherein the application comprises a computer-executable image of a container-based application.

3. An apparatus according to claim 1, wherein the processor is to poll the cloud-computing environment periodically, at approximately every 10 to 14 hours.

4. An apparatus according to claim 1, wherein the database comprises a secure authentication credential storage facility.

5. An apparatus according to claim 1, wherein, responsive to determining the identity of the cloud-based repository from which to retrieve the application, the processor is to:
retrieve the application from the identified cloud-based repository.

6. An apparatus according to claim 5, wherein the processor is to:
deploy the application in the cloud-computing environment.

7. An automated application code modification method comprising:
prior to receiving application deployment code defining an application to be deployed in a cloud-computing environment, intermittently polling the cloud-computing environment for an attempted deployment of an application;
responsive to detecting an attempted application deployment in the cloud-computing environment, determining that the attempted application deployment experiences a deployment error;
receiving the application deployment code;
determining, based on the application deployment code, an identity of a cloud-based repository from which to retrieve the application;
obtaining, from a database, an authentication credential for the identified repository;
generating, based on the authentication credential, an access token to provide access to the repository; and
modifying the application deployment code to include the generated access token.

8. A method according to claim 7, wherein the application deployment code comprises a computer-executable image of a container-based application.

9. A method according to claim 7, wherein intermittently polling comprises polling the cloud-computing environment periodically, at approximately every 10 to 14 hours.

10. A method according to claim 7, wherein the database comprises a secure authentication credential storage facility.

11. A method according to claim 7, further comprising:
responsive to determining the identity of the cloud-based repository from which to retrieve the application, retrieving the application from the identified cloud-based repository.

12. A method according to claim 7, further comprising:
deploying the application in the cloud-computing environment.

13. A non-transitory machine-readable storage medium comprising instructions which, when executed by a processor, cause the processor to:
intermittently poll the cloud-computing environment for an attempted deployment of an application;
responsive to detecting an attempted application deployment in the cloud-computing environment, determine that the attempted application deployment experiences a deployment error;
analyse deployment code associated with the application to be deployed in the cloud-computing environment;
identify, based on the deployment code, a cloud-based repository from which to retrieve the application;
retrieve, from a secure authentication credential source, an authentication credential for the identified repository, the secure authentication credential source comprising an authentication credential for each of a plurality of repositories;
generate, based on the retrieved authentication credential, an access token to provide access to the identified repository; and
update the deployment code to include the generated access token.

14. A non-transitory machine-readable storage medium according to claim 13, wherein the application deployment code comprises a computer-executable image of a container-based application.

15. A non-transitory machine-readable storage medium according to claim 13, further comprising instructions which, when executed by a processor, cause the processor to:
poll the cloud-computing environment periodically, at approximately every 10 to 14 hours.

16. A non-transitory machine-readable storage medium according to claim 13, wherein the secure authentication credential source comprises a secure authentication credential storage facility.

17. A non-transitory machine-readable storage medium according to claim 13, further comprising instructions which, when executed by a processor, cause the processor to:
retrieve the application from the identified cloud-based repository; and
deploy the application in the cloud-computing environment.

* * * * *